Figure 1:
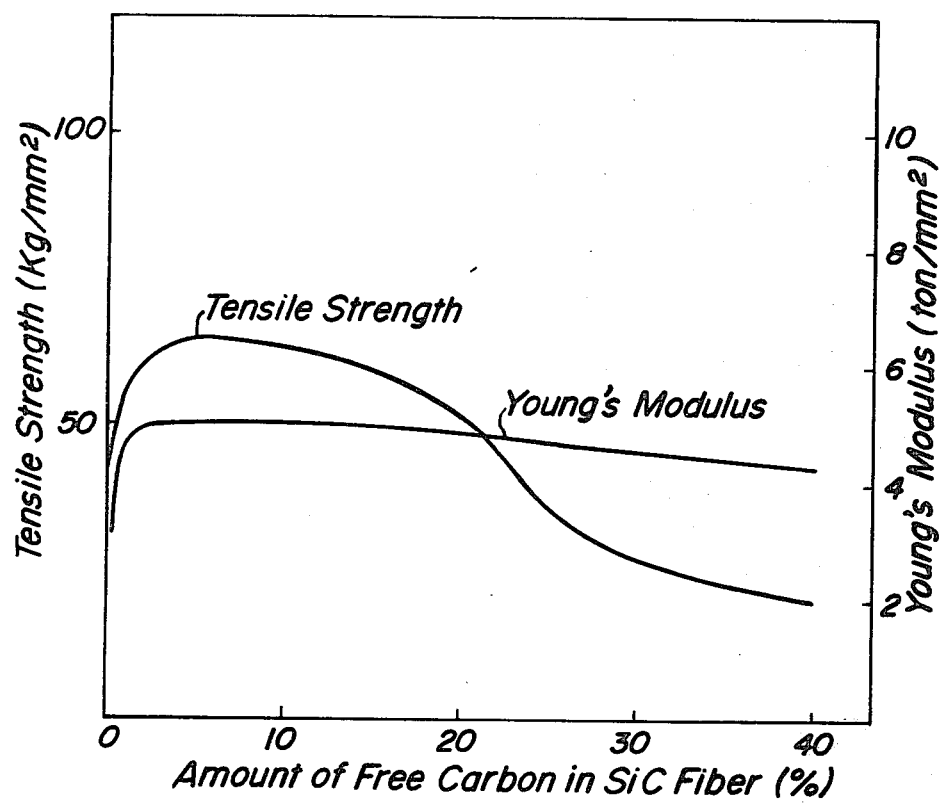

United States Patent [19]

Yajima et al.

[11] 4,134,759
[45] Jan. 16, 1979

[54] LIGHT METAL MATRIX COMPOSITE MATERIALS REINFORCED WITH SILICON CARBIDE FIBERS

[75] Inventors: Seishi Yajima; Josaburo Hayashi; Mamoru Omori; Hideo Kayano, all of Ohnuki, Japan

[73] Assignee: The Research Institute for Iron, Steel and Other Metals of the Tohoku University, Sendai, Japan

[21] Appl. No.: 750,102

[22] Filed: Dec. 13, 1976

[30] Foreign Application Priority Data

Sep. 1, 1976 [JP] Japan .................... 51-103738

[51] Int. Cl.² ............................................. B22F 3/00
[52] U.S. Cl. ....................................... 75/204; 75/229; 75/DIG. 1; 428/608; 423/345
[58] Field of Search .................. 75/229, 204, DIG. 1; 428/608; 423/345

[56] References Cited

U.S. PATENT DOCUMENTS

| | | | |
|---|---|---|---|
| 3,364,975 | 1/1968 | Gruber | 75/DIG. 1 |
| 3,541,659 | 11/1970 | Cannell et al. | 75/DIG. 1 |
| 3,827,129 | 8/1974 | Denham et al. | 75/229 |

FOREIGN PATENT DOCUMENTS 2236078  3/1974  Fed. Rep. of Germany.

Primary Examiner—Brooks H. Hunt
Attorney, Agent, or Firm—Ladas, Parry, Von Gehr, Goldsmith & Deschamps

[57] ABSTRACT

Light metal composite materials reinforced with novel continuous silicon carbide fibers composed of aluminum, aluminum alloy or magnesium alloy matrix and the continuous silicon carbide fibers containing 0.01–40% by weight of free carbon, in which the free carbon is reacted with aluminum or added metal elements in the aluminum alloy or magnesium alloy to form carbides. When the silicon carbide fibers are coated with a metal or ceramics, the wettability of the silicon carbide fibers to said matrix is more improved.

7 Claims, 5 Drawing Figures

FIG_1

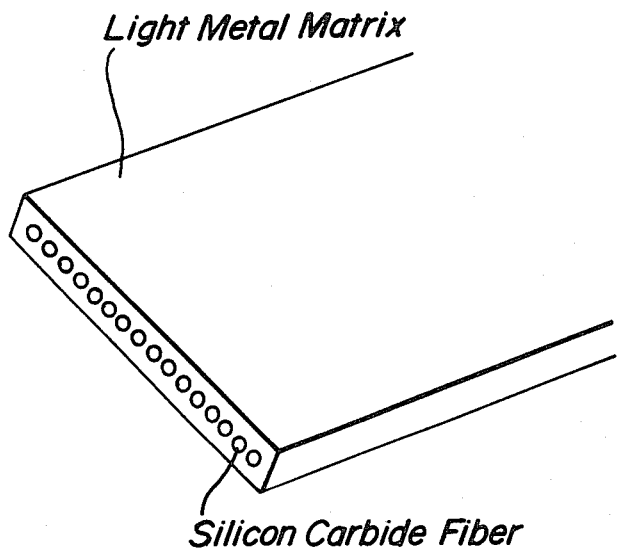
*FIG_3*

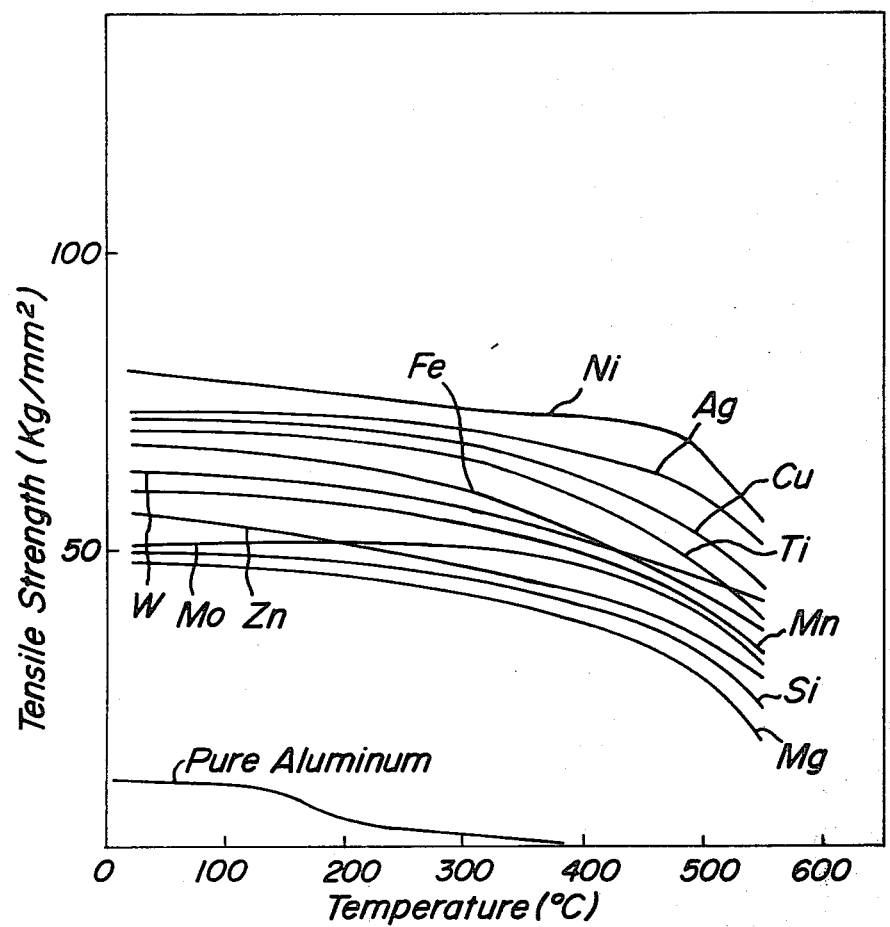
FIG_5

LIGHT METAL MATRIX COMPOSITE MATERIALS REINFORCED WITH SILICON CARBIDE FIBERS

The present invention relats to light metal matrix composite materials reinforced silicon carbide fibers and a method for producing said composite materials, more particularly aluminum, aluminum alloy or magnesium alloy composite materials reinforced with continuous silicon carbide fibers.

Aluminum is light weight and has an excellent corrosion resistance and a high electric conductivity and therefore has various excellent properties as metal. When copper, magnesium, silicon, manganese, zinc, nickel and the like are alone or together added to aluminum, the mechanical properties are noticeably improved and in addition to the excellent properties of pure aluminum, the strength is considerably increased at room temperature and a high temperature and the properties, such as a high corrosion resistance, a high abrasion resistance, a low thermal expansion coefficient and the like are added thereto and excellent industrial and engineering materials satisfying each object can be obtained. These materials are used in a broad field of domestic articles, aircrafts, automobiles, railway vehicles, ships, architectures and the like and the use amount has been yearly increased.

Magnesium has a specific gravity of 1.74 and is most light among industrial and engineering metal materials and therefore has been noticed mainly as aircraft materials. The mechanical properties of magnesium alloys are not inferior to those of aluminum alloys and further the mechanical machinability is very good but heretofore the base metal having the industrial purity is very poor in corrosion and this is the greatest drawback. In order to improve the corrosion resistance, various rust preventing surface treatments have been attempted but it has been impossible to overcome this drawback. When magnesium alloys are used as a casting alloy, cracks are caused in crystal grain boundary due to micro-shrinkage or suboxides are admixed owing to oxidation of molten metal and therefore it is difficult to make sound and reliable products and further when magnesium alloys are used as forging material, magnesium has hexagonal close-packed structure, so that the cold workability is poor as compared with that of aluminum and copper of cubic crystal and therefore the demand of magnesium and magnesium alloys has been few until a recent date.

Extending over the second world war and the postwar, the speed of aircrafts have become higher and the jet engines have been rapidly developed and since magnesium is light weight and the demerit that it is difficult to cause slipping upon the working is considered to be a merit that the deformation is rather hardly caused at a high temperature, the development of magnesium as a heat resistant light alloy has been noticed and the study of heat resistant magnesium alloys has been made extensively. Investigation has been made with respect to the corrosion resistance which is a demerit of magnesium and recently the quality of the base metal has been noticeably improved by progress of a process for refining magnesium, so that the corrosion resistance of magnesium has become very high and the crystal grains have been made very fine by adding zirconium and the like and it has been possible to produce sound castings having a reliable pressure resistance. Furthermore, by addition of rare earth metals, such as cerium, Misch metal, thorium and so on, heat resistant magnesium alloys having a very excellent creep at a high temperature have been produced and various properties of magnesium alloys have been remarkably improved.

Furthermore, it has been proposed that the inherent hexagonal close-packed structure of magnesium is changed into cubic cystal structure by addition of lithium to provide the cold workability.

Heretofore, the study of the composite material consisting of silicon carbide fibers and aluminum, aluminum alloy or magnesium alloy has been made with respect to silicon carbide whiskers and aluminum, aluminum alloy or magnesium alloy, because practically used silicon carbide fibers have been whiskers. However, silicon carbide whiskers composed of SiC alone are poor in wettability to aluminum, aluminum alloy or magnesium alloy and the length of the whiskers is a few mm at the largest, so that it is very difficult to arrange said whiskers regularly, the tensile strength is weak, the Young's modulus is low and the cost is high and therefore the whiskers have not been practically used.

An object of the present invention is to obviate the above described various drawbacks of aluminum, aluminum alloy or magnesium alloy composite materials reinforced with silicon carbide whiskers and to provide aluminum, aluminum alloy or magnesium alloy composite materials reinforced with continuous silicon carbide fibers having a high tensile strength at room temperature and a high temperature and a high Young's modulus.

Another object of the present invention is to provide a method for producing the above described composite materials by using novel continuous silicon carbide fibers produced by the inventors as the reinforcing fibers. The inventors have noticed that when a composite material is made of the novel silicon carbide fibers having a high strength and containing at least 0.01% by weight of free carbon and aluminum, aluminum alloy or magnesium alloy, the mutual wettability of both the substances is improved and the present invention has been accomplished.

The silicon carbide fibers containing at least 0.01% by weight of free carbon to be used for the production of the composite materials of the present invention are produced by the method disclosed in U.S. patent application Ser. No. 677,960.

The reason why the silicon carbide fibers containing at least 0.01% by weight of free carbon and used in the production of aluminum, aluminum alloy or magnesium alloy composite materials reinforced with said silicon carbide fibers according to the present invention is because the silicon carbide fibers containing less than 0.01% by weight of free carbon are poor in the wettability to aluminum, aluminum alloy or magnesium alloy and even if the composite material is constituted, when such composite material is subjected to influences of temperature and outer force, the mutual reinforcing function can not be developed, because there are gaps between the fibers and the metal matrix.

In the present invention, the silicon carbide fibers containing 1–40% by weight of free carbon may be used. The relation of the tensile strength and the Young's modulus of an aluminum composite material containing 25% by volume of the silicon carbide fibers having various amounts of free carbon to the amount of the free carbon is shown in FIG. 1.

Until the amount of the free carbon in the silicon carbide fibers is 5% by weight, the tensile strength of the composite material increases and when said amount is from 5% by weight to 20% by weight, the tensile strength gradually lowers. When the amount of the free carbon exceeds 20% by weight, the tensile strength of the composite material decreases greatly.

The Young's modulus of the composite material does not substantially vary at the amount of the free carbon of more than 1% by weight.

The reason why the tensile strength of the aluminum or aluminum alloy composite materials reinforced with the silicon carbide fibers containing the free carbon according to the present invention is larger than that of the case where the silicon carbide fibers not containing the free carbon are used, is presumably based on the fact that the free carbon contained in the silicon carbide fibers reacts with aluminum metal to form aluminum carbide as shown by the following chemical reaction formula (1), whereby chemical adhesion is obtained other than the physical adhesion.

$$4Al + 3C \rightarrow Al_4C_3 \tag{1}$$

In the case of magnesium alloy composite materials, the free carbon in the silicon carbide fibers also reacts with the elements added in the magnesium alloy to form carbide of the alloy element on the surface of the silicon carbide fibers, whereby the chemical adhesion is presumably obtained other than the physical adhesion.

Figure 2:

In the above described reaction of the free carbon with aluminum or an element added in a magnesium alloy, carbon diffuses from the inner portion of the silicon carbide fiber containing the free carbon to the surface and reacts with aluminum or an element added in a magneisum alloy and further aluminum or an element added in a magnesium alloy diffuses into the inner portion of the silicon carbide fiber and reacts with the free carbon, so that the wettability of the silicon carbide fiber and aluminum or an element added in a magnesium alloy becomes very good. The reaction of the free carbon with aluminum or an element added in a magnesium alloy is very fast but the diffusion speed in which the free carbon diffuses from the inner portion of the silicon carbide fiber and the diffusion speed in which aluminum or an element added in a magnesium alloy diffuses into the inner portion of the silicon carbide fiber are slow, so that it is generally advantageous that the fused metal and the silicon carbide fiber containing the free carbon are contacted and reacted for more than 10 minutes. The microscopic photograph of the cross-section of the aluminum composite material in FIG. 2 shows that there is no gaps around the fiber of the composite material obtained by such a chemical reaction and it is known that the above described wettability is very high.

However, when the composite material produced by using the silicon carbide fibers containing a large amount of the free carbon is used at a relatively high temperature for a long period of time, the free carbon in the silicon carbide fibers reacts with the metal element in the metal matrix which is apt to form a carbide, to form a carbide, whereby the mechanical strength of the silicon carbide fibers is not only lowered, but also the composition and the mechanical strength of the matrix itself gradually vary and particularly the brittleness increases.

In particular, when the silicon carbide fibers containing more than 5% by weight of the free carbon are used, this tendency appears and when the amount of the free carbon is more than 20% by weight, the adverse affect of the formation reaction of the carbide becomes remarkable and as shown in FIG. 1, the tensile strength of the composite material lowers. It is due to the hardening function of the formed carbide that the Young's modulus does not vary as shown in FIG. 1, even if the amount of the free carbon in the silicon carbide fibers varies.

Accordingly, in the silicon carbide fibers containing a large amount of the free carbon, it is necessary to restrain the formation reaction of the carbide while maintaining the wettability. When the surface of the silicon carbide fiber is coated with a metal or ceramics having a moderate bonding ability to the fiber, said coated fibers can reinforce aluminum, aluminum alloy or magnesium alloy matrix and can restrain the variation of the physical and chemical properties of the matrix which is caused by the diffusion of the free carbon into the above described matrix, whereby the composite materials in which the properties are not substantially deteriorated, even if the composite material is used for a long period of time at a high temperature.

The silicon carbide fibers to be used in the present invention are produced by spinning organosilicon high molecular weight compounds and baking the spun fibers to obtain continuous silicon carbide fibers but in the course of the production, if the step for removing carbon is omitted or controlled, the continuous silicon carbide fibers containing less than about 40% of free carbon can be obtained.

An explanation will be made with respect to a method for producing the silicon carbide fibers and the properties.

The silicon carbide fibers containing 0.01–40% by weight of free carbon to be used in the present invention can be produced from the organosilicon compounds classified by the following groups (1)–(10).

(1) Compounds having only Si—C bond.
(2) Compounds having Si—H bond in addition to Si—C bond.
(3) Compounds having Si—Hal bond.
(4) Compounds having Si—N bond.
(5) Compounds having Si—OR bond (R: alkyl or aryl group)
(6) Compounds having Si—OH bond.
(7) Compounds having Si—Si bond.
(8) Compounds having Si—O—Si bond.
(9) Esters of organosilicon compounds, and
(10) Peroxides of organosilicon compounds.

At least one of the organosilicon compounds belonging to the above described groups (1)–(10) is subjected to polycondensation reaction by using at least one process of irradiation, heating and addition of polycondensing catalyst to form organosilicon high molecular weight compounds having silicon and carbon as the main skeleton components. For example, the compounds having the following molecular structures are produced.

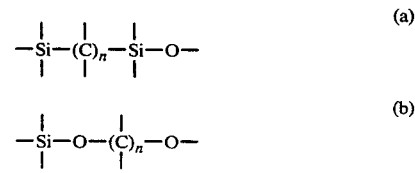

-continued

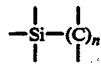 (c)

(d) The compounds having the above described skeleton components (a)–(c) as at least one partial structure in linear, ring and three dimensional structures or a mixtures of the compounds having the above described skeleton components (a)–(c).

The compounds having the above described molecular structures are, for example as follows.

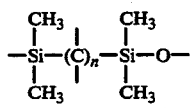 (a)

$n=1$, poly(silmethylenesiloxane),
$n=2$, poly(silethylenesiloxane),
$n=6$, poly(silphenylenesiloxane)

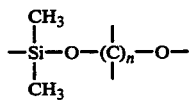 (b)

$n=1$, poly(methyleneoxysiloxane),
$n=2$, poly(ethyleneoxysiloxane),
$n=6$, poly(phenyleneoxysiloxane),
$n=12$, poly(diphenyleneoxysiloxane)

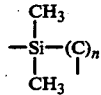 (c)

$n=1$, polysilmethylene,
$n=2$, polysilethelene, (d) The compounds having the above described skeleton components as at least one partial structure in linear, ring and three dimensional structures or mixtures of the compounds during the above described skeleton components (a)–(c).

The above described organosilicon high molecular weight compounds are spun and the spun fibers are preliminarily heated under an oxidizing atmosphere and then baked at a high temperature under at least one atmosphere of vacuum, inert gas, CO gas and hydrogen gas to form silicon carbide fibers having a very high strength and a high Young's modulus.

The ratio of silicon and carbon contained in the above described organosilicon high molecular weight compounds (a)–(d), which are the starting material of the above described continuous silicon carbide fibers is two silicon atoms to at least five carbon atoms, so that when the organosilicon high molecular weight compounds are spun and the spun fibers are baked, many carbons bonding as the side chain of the high molecular weight compounds volatilize as hydrocarbons or organosilicon compounds but 0.01–40% by weight of carbon remains as the free carbon in the silicon carbide fibers.

When the content of the free carbon in the silicon carbide fibers is less than 0.01% by weight, the amount of the free carbon which diffuses from the inner portion of the silicon carbide fibers into the metal matrix and reacts with the matrix metal, is too few, so that the tensile strength of the light metal composite materials reinforced with the silicon carbide fibers is not improved. The silicon carbide fibers produced from the organosilicon high molecular weight compounds can not contain more than 40% by weight of free carbon. Accordingly, the content of the free carbon contained in the silicon carbide fibers to be used for the production of the light metal composite materials reinforced with the silicon carbide fibers must be 0.01–40% by weight.

The tensile strength and the Young's modulus of the silicon carbide fibers to be used in the present invention are shown in the following Table and the silicon carbide fibers having such a high tensile strength have never been known.

Table

| | |
|---|---|
| Tensile strength | 300 – 600 kg/mm$^2$ |
| Specific strength | about 4.0 × 10$^7$ cm |
| Young's modulus | about 20 – 40 t/mm$^2$ |
| Specific Young's modulus | about 1.10 × 10$^9$ cm |

The Young's modulus of the silicon carbide fibers according to the present invention is substantially same as that of carbon fibers which have the highest Young's modulus among various fibers known presently.

When a composite material is produced from aluminum or aluminum alloy and the silicon carbide fibers, the free carbon contained in the silicon fibers reacts with aluminum following to the above described formula (1) to form aluminum carbide ($Al_4C_3$).

The standard free energy variation of said formula is negative and the formation of aluminaum carbide is very easy, so that the free carbon on the surface of the silicon carbide fibers reacts with aluminum to form aluminum carbide. This aluminum carbide bonds the silicon carbide fibers and the matrix of aluminum metal, so that the aluminum carbide acts to improve the wettability of the fibers to aluminum or aluminum alloy.

However, when the silicon carbide fibers contain an amount of the free carbon which exceeds the amount necessary for improving the wettability, the free carbon gradually diffuses into and reacts with aluminum or aluminum alloy to form the carbide in the metal matrix. This carbide deteriorates the toughness of the metal matrix of the composite material and makes the composite material brittle. Therefore, the tensile strength of aluminum composite materials reinforced with the silicon carbide fibers is lowered.

When an aluminum alloy is used for the matrix, among the elements to be added for formation of aluminum alloys, hafnium, zirconium, titanium, calcium, vanadium, chromium, silicon, manganese, molybdenum, niobium, tantalum and tungsten react with the free carbon in the silicon carbide fibers to form the carbides which are stable at a low temperature and more improve the wettability of the silicon carbide fibers to the aluminum alloy. Iron, copper or nickel reacts with SiC, so that the addition of these elements to aluminum or aluminum alloy can improve the wettability of the silicon carbide fibers to aluminum or aluminum alloy. Magnesium alone is scarecely used as industrial and engineering materials and is almost used as magnesium alloys but when a composite material is produced from a magnesium alloy and the silicon carbide fibers, the free carbon contained in the silicon carbide fibers reacts with a metal contained in the magnesium alloy which is apt to form a carbide, for example, Al, Mn, Zr, Si, Ca, Y and the other rare earth metals, Th and so on, to form carbides. In this case, when an amount of the carbide formed is small, the formed carbide does not greatly influence upon the mechanical properties of the metal matrix but when said amount becomes large, the mechanical properties, particularly toughness of the metal matrix lower and the formed composite material becomes brittle. Particularly, in the composite materials composed of a heat resistant magnesium alloy and the silicon carbide fibers containing more than 5% of the free carbon, during use of the composite materials at a high temperature, the formation reaction of the above described carbides proceeds and when such composite materials are used for a long period of time, the composite materials become gradually brittle.

Even if zinc or berillium is contained in the magnesium alloy, these elements do not prevent the formation of the carbide with the free carbon in the silicon carbide fibers, so that it is not necessary to consider the influence of these metals.

When the composite materials are produced by using the silicon carbide fibers containing the free carbon which exceeds the amount necessary for improving the wettability of the silicon carbide fibers to the matrix, the surfaces of such silicon carbide fibers are coated with a metal or ceramics in order to prevent the reaction of the free carbon in the silicon carbide fibers with the matrix metal which exceeds the necessary extent and to maintain the inherent properties of the metal matrix and reinforce the metal matrix with the continuous silicon carbide fibers, and thereafter the aluminum, aluminum alloy or magnesium alloy matrix is reinforced with the coated silicon carbide fibers to form a composite material.

In particular, when a composite material produced by using the silicon carbide fibers containing 5–40% by weight of the free carbon is used at a high temperature, the mechanical properties of the composite material are deteriorated due to the formation reaction of the carbide, but when said silicon carbide fibers are coated with a metal or ceramics and a composite material is produced by using such coated fibers as the reinforcing fibers, even if such a composite material is used at a high temperature for a long period of time, the inherent properties of the metal matrix are maintained and the various excellent physical and chemical properties of the above described continuous silicon carbide fibers can be completely developed.

The coating of the above described silicon carbide fibers with a metal, alloy or ceramics can be effected by the following seven processes, namely (1) chemical vapor deposition process, (2) flame fusion spray coating process, (3) spattering coating process, (4) vapor evaporating coating process, (5) electroplating process, (6) powder baking process and (7) nonelectrode plating process.

(1) Chemical vapor deposition process:

A metal compound gas alone or together with hydrogen gas, oxygen gas, CO gas, a hydrocarbon gas or the other gas is thermally decomposed at a temperature range of 500°–2700° C. to form the above described metal coating on the fiber surface. For example, in the case of tungsten chloride and hydrogen gas, tungsten metal coating is formed from about 500° C. When zirconium iodide gas is thermally decomposed at a temperature range of 1300°–1800° C., zirconium metal coating is formed. When a mixed gas of platinum chloride gas and CO gas is thermally decomposed, platinum coating is formed.

(2) Flame fusion spray coating process:

A metal, alloy or ceramics is fused by a flame having a high temperature and the fused metal, alloy or ceramics is sprayed on the silicon carbide fiber surface to form a coating film. As the above described flame, oxygen-acetylene gas flame and a plasma jet flame may be used.

(3) Spattering coating process:

Argon plasma is formed by a high frequency discharge under argon atmosphere and said plasma bombards a target of metal, alloy or ceramics to evaporate the metal, alloy or ceramics to form the coating on the silicon carbide fiber surface.

(4) Vacuum evaporating coating process:

A metal, alloy or ceramics is heated and evaporated in vacuum atmosphere to form the coating on the silicon carbide fiber surface.

(5) Electroplating process:

An electrolyte containing a metal ion is subjected to electrolysis by using the silicon carbide fibers as a cathode to plate the metal coating on the silicon carbide fibers.

(6) Powder baking process:

Finely divided powders of a metal, alloy or ceramics are prepared and the powders are suspended in a solvent and then the silicon carbide fibers are immersed in the suspension to deposit the powders on the fibers, after which the solvent is evaporated and then heating is effected to form the metal coating on the silicon carbide fibers.

(7) Nonelectrode plating process:

The silicon carbide fiber surface is plated with a metal without using electric energy by applying a chemical substitution of mutual metals and a reduction function. The composition of the plating bath to be used in this process consists of a metal salt, a reducing agent and a buffer solution.

Among ceramics coatings, an oxide coating can be formed by six processes excluding the above described process (5).

Other than the above described six processes, it is possible to form an oxide film by heaing the silicon carbide fibers or the silicon carbide fibers coated with a metal or alloy at a high temperature. The oxide coating can be formed by heating such fibers at a temperature of 500°–2500° C. for 0.1–50 hours under an oxidizing atmosphere. At a temperature of lower than 500° C., the oxidizing temperature is low and the oxide coating is not fully formed and at a temperature of higher than 2500° C., the decomposition and evaporation of silicon carbide extremely proceed, so that the heating temperature must be 500°–2500° C. The heating time under an oxidizing atmosphere needs a long time of 30 hours at a temperature as low as 500° C., while at a temperature as high as 2500° C., a good result can be attained in 0.2 hour. As the oxidizing atmosphere for the heating, air is the most economical and the oxide coating can be formed even by using a mixed gas of ozone and air.

If the above described heating is effected under at least one gaseous atmosphere of nitrogen gas, ammonium gas and a mixed gas of ammonium gas and hydrogen gas, a metal nitride can be formed and the heating temperature in this case is preferred to be 500°–2500° C.

When the silicon carbide fiber surface is coated with a metal or alloy, the wettability of the above described metal or alloy to aluminum, aluminum alloy or magnesium alloy matrix is very good, because the contact angle of the mutual metals is less than 90° and is small. Accordingly, the coating of the silicon carbide fiber surface with a metal or alloy improves the wettability of aluminum, aluminum alloy or magnesium alloy matrix to the silicon carbide fibers and further is effective for preventing the reaction of forming aluminum carbide or carbides of the elements contained in the metal matrix which are apt to form carbides, so that the properties of aluminum, aluminum alloy or magnesium alloy composite materials produced in this manner are noticeably improved. When the metal elements of B, Mn, Mo, Al, W, Si, Cr, Ca, Ce, V, U, Th, Nb, Ta, Ti, Zr and Hf among the coated metals and alloys are respectively heated together with the free carbon, stable carbides are formed. Accordingly, the above described metal coating is partly or entirely converted into the carbide coating through heating when the composite material is formed and the carbide coating prevents the diffusion of the free carbon from the inner portion of the silicon carbide fibers and the reaction of the free carbon with aluminum or the metal element in magnesium alloy to form the carbide.

The advantageous metals to be used for coating the silicon carbide fibers other than the above described metals capable of forming the carbides are Be, Mg, Fe, Co, Ni, Cu, Zn, Ge, Pd, Ag, Cd, Sn, Sb, Pt, Au, and Pb and alloys of at least two metal elements of the above described metal elements.

The advantageous ceramics to be used for coating the silicon carbide fibers include MgO, $Al_2O_3$, $SiO_2$, $TiO_2$ and ZnO as the oxide and AlN, $Mg_3N_2$, $Si_3N_4$, TiN and ZrN as the nitride and TiC, ZrC and WC as the carbide.

When the thickness of the film coated on the above described silicon carbide fibers is less than 100A, the coated film is too thin and the function for preventing the diffusion of the free carbon is weak, while in thickness of more than 2000A, the function for preventing the diffusion of the free carbon is not different from the case where the thickness is not more than 2000A, so that such a large thickness is not necessary. Accordingly, the thickness of the film to coat the silicon carbide fibers containing 0.01–40% by weight of the free carbon is preferred to be 100–2000A.

The composite materials composed of the silicon carbide fibers and aluminum, aluminum alloy or magnesium alloy can be produced by the following methods for producing usual metal composite materials reinforced with fibers, for example, (1) diffusion bonding process,
(2) liquid infiltration process,
(3) fusion spray process,
(4) electrodeposition process,
(5) hot extrude and hot roll process,
(6) chemical vapor deposition process, and
(7) cold press and sintering process.

(1) Diffusion bonding process:

The silicon carbide fibers and the matrix metal wires are arranged alternatively in one direction, the upper surface and the bottom surface of the piled silicon carbide fibers and metal wires are covered with thin films of the matrix metal or only the bottom surface is covered with the above described thin film and the upper surface is covered with matrix metal powders mixed with an organic binder to form composite layers and said layers are laminated in a few stages and then the formed laminate is heated under a pressure to form a composite material composed of the silicon carbide fibers and the matrix metal. As the above described organic binder, the substances which volatilize before heating to a temperature at which the matrix metal and the free carbon in the silicon carbide fibers react and form the carbide, are desirable and for example, starch, CMC, paraffin, resin, ammonium chloride, mineral oil, polyvinyl alcohol, polystyrene, organic polymers and so on can be used.

Alternatively, the silicon carbide fibers coated with matrix metal powders mixed with an organic binder are arranged and piled and the formed laminate is pressed under heating to form a composite material.

(2) Liquid infiltration process:

The spaces between the arranged silicon carbide fibers are filled with the fused aluminum, aluminum alloy or magnesium alloy. In this case, since the wettability of the silicon carbide fibers coated with the metal to the matrix metal is good, the spaces between the arranged fibers can be thoroughly filled with the matrix metal.

(3) Fusing spray process:

The surfaces of the arranged silicon carbide fibers are coated with the matrix metal by a plasma fusion spray or a gas fusion spray to produce a tape-shaped composite material. This tape-shaped composite material is directly used or the tape-shaped composite materials are piled and the formed laminate is subjected to the above described diffusion bonding process (1) to form a composite material.

(4) Electrodeposition process:

The matrix metal is electrolytically deposited on the surfaces of the fibers to form a composite materials and further it is possible to arrange and pile the formed composite materials and the formed laminate is subjected to the above described diffusion bonding process.

(5) Hot extrude and roll process:

The silicon carbide fibers are arranged in one direction and said arranged silicon carbide fibers are put between the matrix metal foils in a sandwich form and then passed through heated rolls to bond the fibers and the matrix metal, whereby a composite material is produced.

(6) Chemical vapor deposition process:

The silicon carbide fibers and charged in a heating furnace and for example, a mixed gas of aluminum chloride and hydrogen gas is introduced therein and aluminum chloride is thermally decomposed to deposit aluminum metal on the surfaces of the silicon carbide fibers and to form a composite material. Furthermore, the metal deposited fibers may be arranged and piled and the formed laminate is subjected to the above described diffusion bonding process (1).

(7) Cold press and sintering process:

The spaces between the arranged fibers are filled with matrix metal powders and the assembly is molded under a pressure, and the formed molding is heated and sintered under pressure or no pressure to form a composite material.

When the composite materials are produced by using the silicon carbide fibers coated with the metal or ceramics, the above described seven processes (1)–(7) may be applied.

The tensile strength ($\sigma_c$) of the composite material produced from the silicon carbide fibers and the metal matrix is represented by the formula (2).

$$\sigma_c = \sigma_f V_f + \sigma_M V_M \quad (2)$$

$\sigma_c$: Tensile strength of the composite material.
$\sigma_f$: Tensile strength of SiC fibers.
$\sigma_M$: Tensile strength of the metal matrix.
$V_f$: % by volume of SiC fibers
$V_M$: % by volume of the metal matrix.

As seen from the above formula (2), the tensile strength of the composite material becomes larger with increase of the volume percent of the silicon carbide fibers in the composite material. Accordingly, the production of the composite material having a higher tensile strength needs increase of the volume percent of the silicon carbide fibers added. However, when the amount of the silicon carbide fibers exceeds 70% by volume, the amount of the metal matrix is too small so that it is impossible to fill fully the spaces between the silicon carbide fibers with the metal matrix, accordingly it is impossible to develop the tensile strength shown by the above formula (2) in the formed composite material. When the amount of the fibers becomes smaller, the tensile strength of the composite material lowers, so that not less than 20% by volume of the silicon carbide fibers should be added in order to obtain the practically useful composite materials. Accordingly, in the production of the light metal composite material reinforced with the silicon carbide fibers according to the present invention, the amount of the silicon carbide fibers to be added must be 20–70% by volume.

The Young's modulus (Ec) of the composite material is shown by the following formula (3).

$$E_c = V_f E_f + V_m E_m \quad (3)$$

$E_c$: Young's modulus of the composite material.
$E_f$: Young's modulus of SiC fibers.
$E_m$: Young's modulus of the metal matrix.
$V_f$: % by volume of SiC fibers.
$V_m$: % by volume of the metal matrix.

As seen from the above formula, the Young's modulus of the composite material becomes larger with increase of the amount of the silicon carbide fibers to be added to the metal matrix. However, when the rate of the fibers becomes too large, the toughness of the composite materials becomes poor, so that the composite materials become brittle and lack in the reliability.

The present invention will be explained in more detail.

Figure 4:
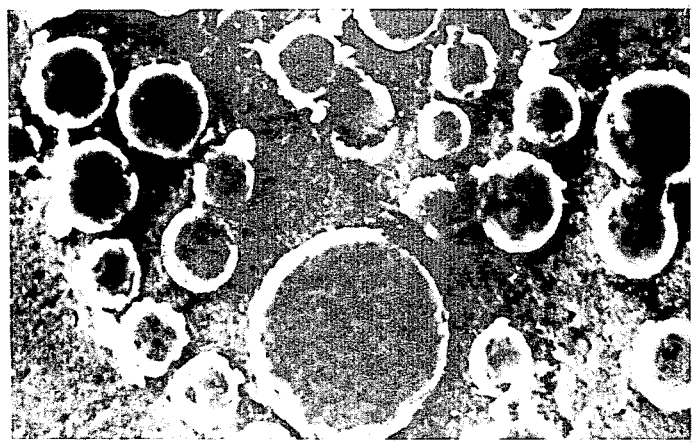

For a better understanding of the invention, reference is taken to the accompanying drawings, therein:

FIG. 1 shows the curves of a relation of the amount of the free carbon in the silicon carbide fibers to the tensile strength and Young's modulus of one embodiment of the composite material according to the present invention, FIG. 2 shows a microscopic photograph of the cross-section of an aluminum composite material according to the present invention, FIG. 3 shows a perspective view of the cross-section of the aluminum composite foil reinforced with the silicon carbide fibers obtained in Example 11, FIG. 4 shows a optical microscopic photograph of the cross-section of an aluminum composite material reinforced with the silicon carbide fibers coated with copper, and FIG. 5 shows a relation of the tensile strength to the temperature variation of the aluminum composite materials produced by using the silicon carbide fibers coated by various metals.

The following examples are given for the purpose of illustration of this invention and are not intended as limitations thereof.

EXAMPLE 1

An example for producing the continuous silicon carbide fibers to be used in the present invention will be explained hereinafter.

Dimethyldichlorosilane and sodium were reacted to produce polydimethylsilane. 250g of polydimethylsilane was charged in an autoclave having a capacity of 1l and air in the autoclave was substituted with argon gas and then the reaction was effected at 470° C. for 14 hours. After completion of the reaction, the formed polycarbosilane was discharged as n-hexane solution. This n-hexane solution was filtrated to remove impurities and then n-hexane was evaporated under a reduced pressure, after which the residue was heated in an oil bath at 280° C. under vacuum for 2 hours to effect concentration. Polycarbosilane was obtained in an yield of 40% based on dimethyldichlorosilane. A number average molecular weight of the formed polycarbosilane was 1700. By using a usual spinning apparatus, the polycarbosilane was heated and melted at 330° C. under argon atmosphere to form a spinning melt and the spinning melt was spun at a spinning rate of 200m/min to obtain polycarbosilane fibers. The fibers were heated by raising the temperature from 20° C. to 190° C. in air in 6 hours and this temperature was kept for 1 hour to effect an unfusing treatment. The thus treated fibers were heated to 1300° C. at a temperature raising rate of 100° C./hr under vacuum of $1 \times 10^{-3}$ mmHg and this temperature was kept for 1 hour to form SiC fibers. The formed SiC fibers had an average diameter of 10 μm, an average tensile strength of 350kg/mm$^2$, an average Young's modulus of $23 \times 10^3$ kg/mm$^2$ and a specific gravity of 2.70g/cm$^3$.

Aluminum was heated and fused in a vacuum chamber of $3 \sim 6 \times 10^{-6}$ mmHg at 800° C. A bundle of continuous silicon carbide fibers having a diameter of 10μ and containing 5% by weight of free carbon was charged in parallel in an alumina pipe, one end of which was sealed and this alumina pipe was introduced into the above described vacuum chamber. Then, the open end of the alumina pipe charging the above described fibers was submerged in the previously fused aluminum metal bath and then argon gas was flowed into the vacuum chamber to raise the pressure in the chamber to 1 atm.

The fused aluminum was pushed up into the alumina pipe and filled between the continuous silicon carbide fibers and reacted with the free carbon in the fibers to form Al$_4$C$_3$. The fused state of aluminum was maintained for 1 hours in order to conduct this formation reaction fully and to make the wettability of the continuous silicon carbide fibers and aluminum higher. An amount of the silicon carbide fibers in the aluminum composite material reinforced with the continuous silicon carbide fibers obtained in the alumina pipe was 41% by volume. The tensile strength of the obtained composite material was 105kg/mm².

While, the tensile strength of aluminum casting is about 10kg/mm² and the composite material produced in the method of the present invention has a tensile strength of about 10 times as high as the aluminum castings.

EXAMPLE 2

Aluminum alloy containing 0.3% by weight of silicon and 0.5% by weight of magnesium was heated was heated and fused in a vacuum chamber of $1 \times 10^{-5}$ mmHg at 705° C. and the fused state was maintained.

A bundle of the continuous silicon carbide fibers, each fiber containing 4% by weight of free carbon and having a diameter of 8 μm was charged in parallel in an aluminum pipe, both ends of which were opened, one end of said pipe was sealed, the other end of said pipe was connected to a vacuum apparatus, said pipe was put in the vacuum chamber and heated and the continuous silicon carbide fibers were degassed. Then, the other end of said alumina pipe was submerged in the above described fused aluminum-silicon-magnesium alloy, after which argon gas was flowed into the above described vacuum chamber to raise the pressure in the chamber to 5mmHg and the pressure in said alumina pipe was $1 \times 10^{-5}$ mmHg of vacuum and the fused aluminum-silicon-magnesium alloy was sucked up in the alumina pipe housing the continuous silicon carbide fibers. The above described sucked up aluminum alloy was maintained in the fused state for 40 minutes to react the free carbon in said silicon carbide fibers with aluminum and silicon to form aluminum alloy composite material reinforced with the continuous silicon carbide fibers. An amount of the silicon carbide fibers in the above described composite material was 48% by volume and the tensile strength of the composite material was 130kg/mm².

EXAMPLE 3

In the same manner as described in Example 2, the fused aluminum alloy containing 4.5% by weight of copper was contacted with the silicon carbide fibers containing 3% by weight of free carbon for 30 minutes to make the wettability of the above described fibers to aluminum-copper alloy higher, whereby the aluminum alloy composite material reinforced with the silicon carbide fibers was obtained. The obtained composite material contained 28% by volume of silicon carbide fibers and a tensile strength of 86kg/mm².

EXAMPLE 4

In the same manner as described in Example 2, a fused aluminum alloy containing 0.3% by weight of silicon, 0.6% by weight of iron and 5% by weight of copper was contacted with the silicon carbide fibers containing 5.5% by weight of free carbon for 20 minutes to make the wettability of the silicon carbide fibers to the above described aluminum alloy higher, whereby the aluminum alloy composite material reinforced with the silicon carbide fibers was obtained. The obtained composite material contained 34% by volume of silicon carbide fibers and had a tensile strength of 103kg/mm².

EXAMPLE 5

A net having about 250 meshes which was obtained by knitting the silicon carbide fibers having a diameter of 10–15 μm and containing 3% by weight of free carbon and aluminum foils were piled alternately and subjected to hot press by applying a pressure of 5 tons/cm² under vacuum at a temperature of 600° C. for 40 minutes to obtain an aluminum composite material reinforced with the silicon carbide fibers. The obtained composite material contained 21% by volume of silicon carbide fibers and had a tensile strength of 54kg/cm².

EXAMPLE 6

A continuous silicon carbide fiber having a diameter of 10 μm and containing 6% by weight of free carbon was passed through a bath having a length of 1m and containing fused aluminum heated at 800° C. under argon atmosphere at a feeding rate of 8cm/min to make the wettability of the continuous silicon carbide fiber to aluminum higher, whereby an aluminum composite wire reinforced with the continuous silicon carbide fiber was obtained. The formed wire had a diameter of 30 μm, the tensile strength was 51kg/mm², which is about 5 times as high as that of aluminum and the Young's modulus was $15.0 \times 10^3$ kg/mm², which is about 2 times as high as that of aluminum.

EXAMPLE 7

Magnesium alloy consisting of 10% by weight of aluminum, 0.5% by weight of manganese and the remainder being magnesium was heated and fused in a chamber under argon atmosphere at 1050° C. A bundle of the silicon carbide fibers, each having a diameter of 10 μm and containing 4% by weight of free carbon was charged in parallel in a magnesia pipe, both ends of which were opened, and one end of said pipe was sealed and the other end was connected to a vacuum system and the pipe was degassed while heating and said pipe was put in the above described chamber under argon atmosphere and the sealing was removed. The opened end of this magnesia pipe was submerged in the above described fused magnesium alloy and the other end was made vacuous. The fused magnesium alloy was pushed up into the magnesia pipe and filled between the silicon carbide fibers and the fused state of the magnesium alloy was maintained for 30 minutes to obtain a magnesium alloy composite material reinforced with the silicon carbide fibers. The obtained composite material contained 25% by volume of the fibers and had a tensile strength of 73kg/mm². This tensile strength was about 4 times as high as that of the magnesium alloy containing no silicon carbide fibers. From this result, it can be seen that the reinforcing effect of the silicon carbide fibers is fully developed and the free carbon in the silicon carbide fibers reacts with aluminum in the magnesium alloy and the wettability of the fiber to the metal matrix is good.

EXAMPLE 8

Magnesium alloy consisting of 93.4% by weight of magnesium, 0.6% by weight of zirconium, 2.0% by weight of yttrium and 4.0% by weight of zinc was heated and fused in a chamber under argon gas atmosphere at 800° C. A bundle of the silicon carbide fibers, each having a diameter of 15 μm and containing 6% by weight of free carbon was charged in parallel in a magnesium pipe, both ends of which were opened and in the same manner as described in Example 7, the spaces between the silicon carbide fibers were filled with the fused magnesium alloy and the fused state of magnesium alloy was kept for 1 hour to obtain a magnesium alloy composite material reinforced with the silicon carbide fibers. The obtained composite material contained 32% by volume of the silicon carbide fibers and had a tensile strength of 87kg/mm$^2$. The composite effect of the fibers and the metal was recognized and the free carbon in the fibers reacts with the added elements in the alloy to improve the wettability of the fibers to the alloy and the property as the composite material was developed.

EXAMPLE 9

The silicon carbide fibers containing 5% by weight of free carbon were piled in parallel and the spaces between the silicon carbide fibers were filled with magnesium alloy powders consisting of 1.0% by weight of manganese, 0.1% by weight of calcium, 0.25% by weight of silicon, 0.03% by weight of copper, 0.008% by weight of nickel, 0.20% by weight of the other element and 98.412% by weight of magnesium to form a molding having 20mm × 50mm × mm. Said molding was subjected to hot press under a pressure of 0.5ton/cm$^2$ under argon atmosphere at 550° C. for 4 hours to obtain a magnesium alloy composite material reinforced with the silicon carbide fibers. The obtained composite material contained 30% by volume of the fibers and had a tensile strength of 30kg/mm$^2$. This tensile strength was about 2 times as a high as that of the magnesium alloy containing no fibers, so that the composite effect was recognized and this shows that the free carbon in the fibers reacts with the added elements in the magnesium alloy to improve the wettability of the fibers to the alloy.

EXAMPLE 10

A woven fabric composed of the silicon carbide fibers, each having a diameter of 10 μm and containing 10% by weight of free carbon was cut into discs having a diameter of 100mm. The formed discs were arranged at a distance of 0.02mm and such arranged discs were put in a chamber under argon atmosphere. Magnesium alloy consisting of 9.5% by weight of aluminum, 0.5% by weight of manganese, 2.1% by weight of zinc, 0.2% by weight of silicon, 0.1% by weight of copper, 0.05% by weight of nickel, 0.25% by weight of the other elements and 87.3% by weight of magnesium was charged in the chamber under argon atmosphere and fused by heating at 800° C. and the fused alloy was poured to the above described arranged woven fibrous fabrics. The fused state of the magnesium alloy was kept for 30 minutes to obtain a magnesium alloy composite material reinforced with the silicon carbide fibers. The obtained composite material contained 25% by volume of the silicon carbide fibers and had a tensile strength of 65kg/mm$^2$. This tensile strength was about 3 times as high as that of the magnesium alloy containing no fibers. This shows that the free carbon reacts with the added elements in the alloy to improve the wettability of the fibers to the alloy.

EXAMPLE 11

Surface of the silicon carbide fibers containing 13% by weight of free carbon (average diameter: 20 μm, average tensile strength: 300kg/mm$^2$, average Young's modulus: 3.0 × 10$^4$kg/mm$^3$) were coated with a vacuum evaporating coating process to form a coating film having a thickness of 400–500A of tungsten, molybdenum, copper, silicon, magnesium, zinc, iron, manganese, nickel, titanium or silver metal.

The above described coated silicon carbide fibers were arranged in parallel in a layer on a pure aluminum foil having a thickness of 0.05mm and then the arranged coated silicon carbide fiber layer was covered with said aluminum foil and the assembly was passed through hot rolls heated at a temperature of 600° C. to form a composite foil consisting of the silicon carbide fibers and aluminum. The schematic view of this composite foil is shown in FIG. 3. 20 Composite foils were superposed and subjected to hot press at a temperature of 600° C. to obtain an aluminum composite material reinforced with the silicon carbide fibers.

The obtained composite material contained 25% by volume of silicon carbide fibers. As one embodiment when the structure of the composite material was observed with optical microscope, a structure photograph of the composite material manufactured by using the silicon carbide fibers coated with copper is shown in FIG. 4. As shown in FIG. 4, the bonding of the silicon carbide fibers and aluminum is very good and the silicon carbide fibers tightly adhere to aluminum. The mechanical properties of the composite materials produced by using the silicon carbide fibers coated with the metals as shown in the following Table 1 are shown in the following Table.

Table 1

| | Coating metal element | | | | | | | | | | |
|---|---|---|---|---|---|---|---|---|---|---|---|
| | W | Mo | Cu | Si | Mg | Zn | Fe | Mn | Ni | Ti | Ag |
| Tensile strength (kg/mm$^2$) | 63 | 51 | 72 | 49 | 48 | 56 | 68 | 60 | 80 | 70 | 73 |
| Young's modulus (10$^3$kg/mm$^2$) | 16 | 15 | 14 | 16 | 13 | 15 | 17 | 16 | 14 | 16 | 13 |
| Elongation (%) | 2.3 | 2.4 | 2.1 | 2.8 | 3.1 | 3.3 | 2.3 | 2.7 | 3.0 | 2.6 | 3.4 |

Tensile strength of pure aluminum is about 11kg/mm$^2$, Young's modulus is about 7 × 10$^3$kg/mm$^2$ and elongation is about 25%. The tensile strengths of the composite materials shown in the above Table 1 more or less vary depending upon the kind of the coating metal but are a few times as high as that of pure aluminum. Young's moduli of the composite materials are about twice as high as that of the pure aluminum. The elongations of the composite materials are far smaller than that of pure aluminum. While, in the composite material produced from the silicon carbide fibers not coated with metal and pure aluminum, the elongation is less than 2% and is very small. When compared with this value it can be seen that the effect of coating is noticeable. The relation of the tensile strengths of the above described composite materials to the temperature variation is shown in FIG. 5. As seen from FIG. 5, pure aluminum is low in the tensile strength even at room temperature and when the temperature exceeds 200° C., the tensile strength extremely lowers. While, the composite materials of the present invention are small in decrease of the tensile strength to 500° C. and maintain a fairly high temperature. Furthermore, even when these composite materials were kept at a high temperature of 400° C. for 150 hours, the variation of properties were not recognized.

EXAMPLE 12

Surfaces of the silicon carbide fibers containing 20% by weight of free carbon (tensile strength: 320kg/mm$^2$, Young's modulus: 2.8 × 10$^4$kg/mm$^2$) were coated with 18 Cr stainless, Inconel X, ASTM 1A copper alloy, Zircalloy 2 and Ti-8Mn titanium alloy by means of a usual flame fusion spray coating apparatus to form each coating film having a thickness of about 600A.

The above described coated silicon carbide fibers were arranged in parallel and charged in a stainless foil mold of 2mm×20mm×100mm and one end of said mold was put in a fused aluminum (1060-H 18 aluminum alloy) heated at 800° C. and pressure in said mold was reduced from the other end, whereby the fused aluminum was sucked up into the coated silicon carbide fibers. Then, the mold was cooled, after which the stainless foil was broken and an aluminum composite material was teken out. The obtained aluminum composite materials had 40% by volume of the silicon carbide fibers. The mechanical properties of these composite materials at room temperature are shown in the following Table 2.

Table 2

| | Coating alloy | | | | |
|---|---|---|---|---|---|
| | 18 Cr stainless | Inconel X | Zircalloy 2 | Ti-8Mn | ASTM1A copper alloy |
| Tensile strength (kg/mm$^2$) | 125 | 141 | 138 | 115 | 121 |
| Young's modulus (10$^3$kg/mm$^2$) | 21 | 22 | 21 | 18 | 19 |
| Elongation (%) | 2.6 | 2.9 | 2.4 | 3.1 | 2.8 |

The tensile strength of the matrix of 1060-H 18 aluminum alloy is about 13kg/mm$^2$ and the Young's modulus is about 9×10$^3$kg/mm$^2$ and the elongation is about 6%. As seen from the above Table 2, in the aluminum composite materials according to the present invention, the tensile strength is about 10 times as high as that of the matrix, the Young's modulus is about 2.5 times as high as that of the matrix and the elongation is about 3% and these data show that the aluminum composite materials of the present invention have very excellent properties. Furthermore, even when the composite materials were kept at a high temperature of 450° C. for a long time (150 hours), the properties did not change.

EXAMPLE 13

Surfaces of silicon carbide fibers containing 5% by weight of free carbon (tensile strength: 340kg/mm$^2$, Young's modulus: 35×10$^4$kg/mm$^2$) were coated with ZrN, CaO, TiC, HfB and Nb$_5$Si$_3$ to a thickness of about 800A under argon atmosphere by means of a high frequency bipolar spattering apparatus. The coated silicon fibers were arranged in parallel in a layer on an aluminum foil having a thickness of 0.2 μm and such arranged silicon carbide fiber layer was covered with aluminum fine powders (5154-0 aluminum alloy) of less than 325 meshes and the assembly was subjected to hot press under a pressure of 200kg/cm$^2$ at a temperature of 560° C. to obtain a composite foil. 20 Composite foils were superposed and subjected to hot press under the same conditions as described above to obtain aluminum composite materials. The obtained composite materials contained 30% by volume of the silicon carbide fibers. The mechanical strengths of the composite materials are shown in the following Table 3.

Table 3

| | Coating ceramics | | | | |
|---|---|---|---|---|---|
| | ZrN | CaO | TiC | HfB | Nb$_5$Si$_3$ |
| Tensile strength (kg/mm$^2$) | 104 | 98 | 89 | 110 | 101 |
| Young's modulus (10$^3$kg/mm$^2$) | 23 | 27 | 16 | 21 | 25 |

Table 3-continued

| | Coating ceramics | | | | |
|---|---|---|---|---|---|
| | ZrN | CaO | TiC | HfB | Nb$_5$Si$_3$ |
| Elongation (%) | 3.1 | 2.9 | 3.3 | 2.5 | 2.2 |

The tensile strength of 5140-0 aluminum alloy is 24kg/mm$^2$ and the elongation is 27%. As shown in the above Table 3, the tensile strengths of the composite materials according to the present invention are very high and the Young's moduli are also high and the elongation is about 3% and these materials can be satisfactorily used as the composite material. Even when these composite materials were kept at 450° C. for a long time (150 hours), the properties did not change.

EXAMPLE 14

Silicon carbide fibers containing 10% by weight of free carbon (tensile strength: 300kg/mm$^2$, Young's modulus: 2.5×10$^4$kg/mm$^2$) were coated with Al, Zr, Cr, or V metal to a thickness of 500–1000A by means of a vacuum evaporating coating apparatus. Then, the silicon carbide fibers coated with Al were oxidized at 500° C. for 1 hour to form the silicon carbide fibers coated with Al$_2$O$_3$. The other metal coatings were oxidized at 1000° C. in air to form the silicon carbide fibers coated with ZrO$_2$, Cr$_2$O$_3$ or V$_2$O$_5$.

The above described coated silicon carbide fibers were coated with aluminum alloy (5357-H38) to a thickness of 0.1–10 μm by means of a flame fusion spray coating apparatus. The silicon carbide fibers coated with the aluminum alloy were piled in a mold of 7mm×10mm×50mm and subjected to hot press under a pressure of 200kg/mm$^2$ at 500° C. to obtain aluminum composite materials. These composite materials contained 32% by volume of the silicon carbide fibers. The mechanical properties of the composite materials are shown in the following Table 4.

Table 4

| | Coating ceramics | | | |
|---|---|---|---|---|
| | Al$_2$O$_3$ | ZrO$_2$ | Cr$_2$O$_3$ | V$_2$O$_5$ |
| Tensile strength (kg/mm$^2$) | 87 | 93 | 78 | 96 |
| Young's modulus (10$^3$kg/mm$^2$) | 21 | 18 | 19 | 25 |
| Elongation (%) | 2.3 | 3.1 | 2.1 | 2.5 |

The tensile strength of the aluminum alloy (5357-H38) was 23kg/mm$^2$. The tensile strengths of the composite materials according to the present invention are 4–5 times as high as that of the above described aluminum alloy and the composite materials having excellent properties were produced. Even when these composite materials were kept at a high temperature of 450° C. for a long time (150 hours), the properties did not change.

EXAMPLE 15

Silicon carbide fibers containing 13% by weight of free carbon were baked at 1200° C. in air for 2 hours to form SiO$_2$ coating films on the surfaces of the fibers and simultaneously to remove free carbon. The silicon carbide fibers coated with SiO$_2$ were closely arranged in a layer on a pure aluminum foil having a thickness of 0.05 mm and then the silicon carbide fiber layer was covered with said pure aluminum foil having the same thickness as described above and the assembly was subjected to hot roll while heating at 650° C. to form a composite foil. 20 Composite foils were superposed and subjected to hot press at a temperature of 640° C. for 1 hour to obtain an aluminum composite material reinforced with the silicon carbide fibers. The obtained aluminum composite material contained 25% by volume of the silicon carbide fibers. The tensile strength of the composite material was 110kg/mm², while the tensile strength of the composite material produced from the silicon carbide fibers not coated with SiO₂ and aluminum was 35kg/mm². As seen from the comparison, the tensile strength of the composite material according to the present invention is much larger than this comparative composite material. Even when the composite material was kept at 450° C. for a long time (100 hours), the properties did not change.

EXAMPLE 16

Magnesium alloy composite materials were produced from 60% by volume of magnesium alloy consisting of 3.0% by weight of aluminum, 1% by weight of manganese, 1.3% by weight of zinc and remainder being magnesium and 40% by volume of the silicon carbide fibers containing 15% by weight of free carbon. Silicon carbide fibers (diameter: 20 μm) were coated with nickel, copper or 13% iron-chromium alloy to a thickness of about 800A by a vacuum evaporating coating process.

The silicon carbide fibers having a diameter of 20 μm were heated at 1,100° C. in air for 1 hour to obtain the silicon carbide fibers coated with silicon oxide.

The surfaces of these fibers were coated with a mixture of the above described magnesium alloy powders (95% by weight) and paraffin (5% by weight) to an average thickness of 12 μm and the thus treated fibers were arranged and piled in a mold of 20mm×50mm×30mm and kept under a pressure of 200kg/mm² at 480° C. in argon gas atmosphere for 1 hour to obtain magnesium alloy composite materials. The tensile strengths and the Young's moduli of the composite materials are shown in the following Table 5.

Table 5

| | Coating material | | | |
|---|---|---|---|---|
| | Nickel | Copper | 13% iron-chromium | SiO₂ |
| Tensile strength (kg/mm²) | 95 | 99 | 87 | 85 |
| Young's modulus (10³kg/mm²) | 16 | 18 | 17 | 16 |
| Elongation (%) | 1.5 | 1.2 | 1.6 | 1.8 |

In the magnesium alloy, the tensile strength is 22kg/mm² and the Young's modulus is 4.6×10³kg/mm² and as compared with these values, the tensile strength and the Young's modulus of the magnesium alloy composite materials according to the present invention were much higher as seen from the above Table 5. Even when the magnesium alloy composite materials were kept at 480° C. for a long time (50 hours), the properties did not lower.

EXAMPLE 17

Surfaces of the silicon carbide fibers containing 13% by weight of free carbon (average diameter: 15 μm, average tensile strength: 250kg/mm², average Young's modulus: 20ton/mm²) were plated with copper to a thickness of 0.2-0.4 μm by means of a non-electrode plating liquid of Cuposite copper mix 328.

The above described copper plated silicon carbide fibers were arranged uniformaly on an aluminum (HZ/102) foil and aluminum was plasma sprayed to produce a composite foil. The above described composite foils were superposed and subjected to hot press under pressure of 50kg/cm² at 630° C. under vacuum for 90 minutes to produce a composite material. The obtained composite material contained 30% by volume of silicon carbide fibers and had a tensile strength of 55kg/mm². Even if this composite material was heated at 500° C. for a long time, the tensile strength did not change. The aluminum, aluminum alloy or magnesium alloy composite materials reinforced with the continuous silicon carbide fibers obtained in the present invention are very high in the tensile strength and high in the Young's modulus, so that the composite materials can be used as the following various materials.

(a) Materials for apparatus for producing synthetic fibers:
Bobbin, Separator, Pump parts, Ball, Sleeve, Mechanical seal, Valve, Nozzle, Stirrer, Reaction Vessel, Pipe, Heat exchanger and so on.

(b) Materials for apparatus for synthetic chemistry:
Plunger pump, Sleeve, Mechanical seal, Separator, Reactor valve, Reducing valve, Seat, Heat exchanger, Centrifugal machine, Vessel for a low temperature and so on.

(c) Mechanical industrial materials:
Heat exchanger, Die for pressing powders, Ultrasonic working machine, Honing machine, Sewing machine parts, Cam, Ball-mill parts, Camera parts, vacuum pump, Collector, Bearing, Tool, Watch parts, Base for machine and so on.

(d) Materials for domestic and office supplies:
Desk, Various shelves, Chair, Various lockers and so on.

(e) Materials for constructing machine:
Boring machine, Roic crusher, Crusher, Caterpillar, Sand pump, Power shovel and so on.

(f) Fire protecting materials:
Sprinkler, Ladder and so on.

(g) Marine (cosmic) materials:
Heatexchanger, Antenna, Buoy on water, Tank and so on.

(h) Automobile materials:
Engine, Manifold, Carrier for differntial gear, Crank case, Pump body, Valve body, Clutch housing, Case for transmission, Gear box, Fly-wheel housing, Cylinder block, Cylinder head, Piston, Pulley, Pump body, Blower housing, Tire mold, Rotary engine, Construction material, Body material and so on.

(i) Materials for apparatus for producing food:
Supermarket decanter, Valve, Reactor, Mechanical seal, Separator and so on.

(j) Sport materials:
Spike, Golf articles, Tennis racket, Fishing article, Mountain-climbing goods, Ski goods, Badminton racket, Ball and so on.

(k) Ship and aircraft materials:

Engine, Cosntruction materials, Outer wall, Screw, Wing in water and so on.

(l) Electrical materials:
Transmission cable, Condenser, Chassis, Antenna, Sterophonic parts, Pole and so on.

(m) Architecture materials:
Window sash, Construction materials and so on. (n) Agricultural machines, Fishing implements, Atomic implements, Nuclear fussion furnace material, Sun heat utilizing material, Medical instruments, Cycle materials, Valve, Valve seat, Ring, Rod, Disc, Liner, Sand transport pump parts, Machine parts for treating dust, Die and nozzle for extrusion or injection of plastics, Reflection mirror and so on.

What is claimed is:

1. A method for producing aluminum, aluminum alloy or magnesium alloy composite material reinforced with continuous silicon carbide fibers, which comprises arranging 80–20% by volume of the continuous silicon carbide fibers containing 0.01–40% by weight of free carbon obtained by baking spun fibers consisting mainly of an organosilicon high molecular weight compound in 20–80% by volume of fused aluminum matrix, to react the free carbon contained in the silicon carbide fibers with aluminum or the metal elements contained in the above described aluminum alloy or magnesium alloy which easily form carbides, to form carbides of these metals and to make the wettability of the silicon carbide fibers to the metal matrix high.

2. The method as claimed in claim 1, wherein the metal element in said aluminum alloy which easily forms the carbide with the free carbon is silicon, manganese, chromium, titanium or calcium.

3. The method as claimed in claim 1, wherein the metal element in said magnesium alloy which easily forms the carbide with the free carbon is aluminum, manganese, zirconium, silicon calcium or yttrium.

4. The method as claimed in claim 1, wherein said continuous silicon carbide fibers are coated with at least one material selected from a metal or a ceramic.

5. The method as claimed in claim 4, wherein said metal is selected from the group consisting of B, Mn, Mo, Al, W, Si, Cr, Ca, Ce, V, U, Th, Nb, Ta, Ti, Zr, and Hf.

6. The method as claimed in claim 4, wherein said metal is selected from the group consisting of Be, Mg, Fe, Co, Ni, Cu, Zn, Ge, Pd, Ag, Cd, Sn, Sb, Pt, Au and Pb and alloys consisting of at least two metal elements of the above metals.

7. The method as claimed in claim 4, wherein said ceramics are $MgO$, $Al_2O_3$, $TiO_2$, $ZnO$, $AlN$, $Mg_2N_2$, $Si_3N_4$, $TiN$, $ZrN$, $TiC$, $ZrC$ or $WC$.

* * * * *